Nov. 18, 1958
A. A. ASHTON
2,860,734
BRAKE AND FLEXIBLE COUPLING FOR ROTARY MECHANISMS
Filed March 9, 1953
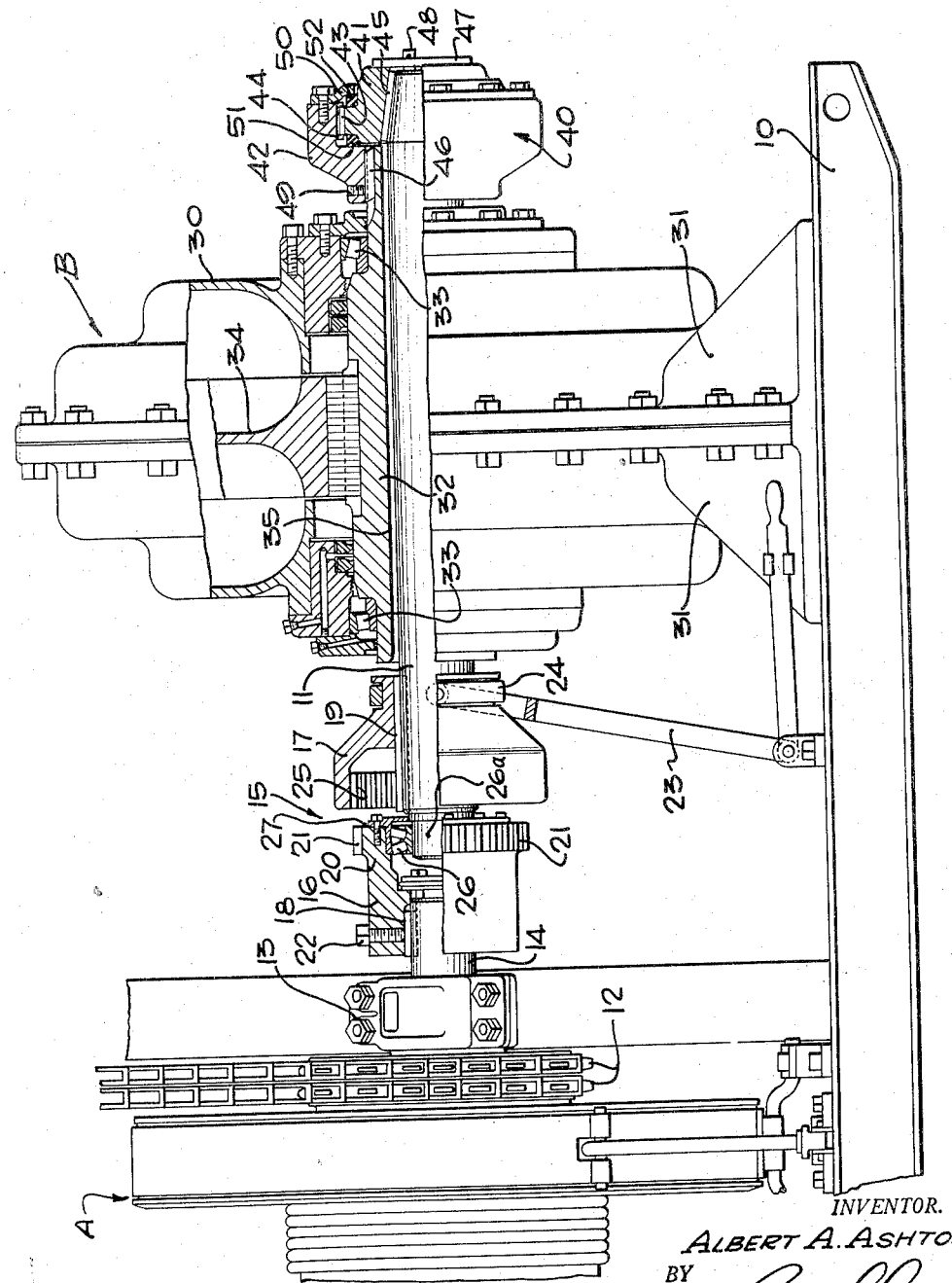
INVENTOR.
ALBERT A. ASHTON,
BY
ATTORNEY United States Patent Office 2,860,734
Patented Nov. 18, 1958

2,860,734

BRAKE AND FLEXIBLE COUPLING FOR ROTARY MECHANISMS

Albert A. Ashton, Houston, Tex., assignor, by mesne assignments, to The Youngstown Sheet and Tube Company Application March 9, 1953, Serial No. 341,269

3 Claims. (Cl. 188—90)

This invention relates to the flexible coupling of rotary mechanisms wherein the power shaft of a driven mechanism is operatively connected to the power shaft of a driving mechanism. The details of the invention will be described, for convenience, by reference to an embodiment adapted for use in a well-drilling drawworks and in particular with a fluid brake of a type commonly used in such drawworks. I desire to have it understood, however, that although the invention is described with reference to such an embodiment, it is not limited thereto, for it is adaptable and useful generally where a driving means is coupled to a driven mechanism, as will more clearly appear hereinafter.

In the embodiment to be described a fluid brake is connected through a floating shaft with flexible couplings to a hoisting or spooling drum as part of a well-drilling drawworks. Such equipment when in use is subjected to great stresses from the very heavy loads which it handles and consequently the power shafts of the several mechanisms of the drawworks become misaligned even though originally installed in alignment. The present invention provides an effective means for flexibly connecting the several mechanisms together in an end to end relation, in a manner to reduce the crank action and the rubbing and wear of the parts of the misaligned mechanisms.

An object of the invention is to provide an improved flexible coupling of simple construction for connecting power shafts which may become misaligned.

It is also an object of the invention to provide a flexible coupling for close-coupled rotatable parts, this flexible coupling having a so called floating shaft which passes axially through at least one of the rotatable parts from the end thereof near to the other rotatable part to the end thereof far from the other rotatable part, there being rugged flexible couplings on the ends of the floating shaft connecting the shaft to the rotatable parts, whereby minimum angular disalignment of the parts of the flexible couplings occurs as the result of disalignment of the axes of the rotary parts.

Other objects and advantages of the invention will become apparent from the following detailed description, taken in connection with the accompanying drawings which show a front elevation, partly in vertical midsection, of a spooling drum, fluid brake and floating shaft assembly, embodying the invention.

Referring to said drawing which is for illustrative purposes only, the letter A designates a spooling drum, only a portion of which is shown, and the letter B designates a fluid brake. These mechanisms are firmly mounted on a base 10 and are operatively connected to each other by means of the floating shaft 11 in an arrangement suitable for a well drilling drawworks. For the purposes of simplifying this description the driving mechanism, mentioned above, will be referred to hereinafter as the spooling drum A, while the driven mechanism is represented by the brake B. Actually, however, a spooling drum constitutes a driven mechanism, since it derives its torque from a motor or other like source of power.

The spooling drum as illustrated is of conventional design. It is driven through the sprockets 12 from a suitable source of power (not shown). At 13 is shown a bearing support on which the drum shaft 14 is rotatably mounted.

The end of the drum shaft 14 is coupled to the adjacent end of the floating shaft 11 by means of a flexible coupling, designated generally by the numeral 15, forming a releasable driving connection between the drum shaft and the floating shaft. The coupling 15 comprises the clutch hubs 16 and 17 respectively which are keyed, as with the keys 18 and 19 respectively, upon the ends of the shafts 14 and 11 respectively, whereby each hub is held against rotation with respect to the shaft upon which it is mounted. The hub 16 is formed with a flanged portion 20, having gear teeth 21 on its rim, and is held against axial movement along the drum shaft by means of the pin 22.

The clutch hub 17 is axially shiftable on the floating shaft 11. Such shifting of the hub is accomplished by means of a hand lever 23 which is pivoted on the shifter ring 24 of the hub 17. This hub has a flanged portion which fits over the rim of the flanged portion of hub 16 when the hubs are coupled. Gear teeth 25 are formed on the inside of the end portion of the clutch hub 17 to engage with the gear teeth 21 of the hub 16 but having sufficient clearance from the teeth 21 to permit required flexibility of the coupling 15. When the clutch hub 17 is shifted toward the hub 16 the sets of gear teeth become engaged whereupon torque is transmitted from the drum shaft through the key 18, hub 16, gear teeth 21 and 25, hub 17, key 19 to the floating shaft.

The end of the floating shaft is reduced in diameter and is directly supported from the rotatable part 14 when the clutch means 16—17 are disengaged by a self-aligning roller bearing 26 which fits into a recess in the hub and is held therein by the retaining ring 27. The end of the floating shaft 11 has a reduced portion 26a which extends into the inner race of the bearing 26.

Referring now to the fluid brake B, it may be of the type shown in Patent No. 2,240,741, which includes a stationary housing 30 fastened to and supported on the sled 10 by the braces 31. The rotary shaft 32 of the brake is journaled in the bearings 33, carried by the housing. The rotor 34 is secured to the shaft 32 to rotate therewith.

The conventional way for connecting a floating shaft to a mechanism is to couple the floating shaft to that end of a power shaft which extends toward the other power shaft to be coupled. According to the present invention the floating shaft is coupled to the opposite end of the power shaft, i. e., that end which extends away from the power shaft to be coupled. This is accomplished by providing an axial bore as at 35 through the power shaft, e. g., rotary shaft 32, whereby the floating shaft may extend through the bore. The diameter of the bore is larger than that of the floating shaft whereby the bore may freely accommodate the shaft when they become misaligned.

The protruding end of the shaft 11 is coupled to the rotary member 32 by the flexible coupling generally designated by the numeral 40. This coupling is somewhat similar in construction to the flexible coupling 15 described above; however these couplings operate differently in that the coupling hubs 41 and 42 of the coupling 40 are continuously engaged, whereas clutch hubs 16 and 17 of coupling 15 may be disengaged. Since said coupling hubs are continuously engaged, the rotor of the fluid brake is caused to be rotated whenever the floating shaft is rotated. The coupling hub 41, which corresponds in construction to the clutch hub 16, has a flanged portion with axially aligned gear teeth 43 on its rim. The coupling hub 42, which corresponds in construction to the clutch hub 17 has a sleeve portion which fits tightly over the protruding end of rotary shaft 32. Gear teeth 44 on the inside of member 42 engage with the gear teeth of member 41 with sufficient clearance to provide a small flexibility in the coupling. The coupling member 41 is keyed on the tapered end of the floating shaft and the coupling member 42 is keyed on the rotary shaft by means of the keys 45 and 46 respectively, whereby each coupling member will rotate with the shaft on which it is mounted. A cover or end plate 47, which is fastened on the end of the floating shaft by the pin 48 holds the coupling member 41 on the tapered end of the floating shaft and prevents axial movement of the member with respect to the shaft. A pin 49 is provided to hold member 42 on the rotary shaft 32. A clamping ring 50 is secured on the end of the lip of member 42 to hold the flanged portion of member 41 within the member 42 and keep the gear teeth of each member continuously engaged. Rubber rings 51 and 52 are provided on opposite sides of the flanged portion of member 41 to exert a centralizing and stabilizing effect. The torque imparted to the floating shaft from the driving mechanism is transmitted from the floating shaft through the key 45, coupling member 41, gear teeth 43 and 44, coupling member 42, key 46 to the rotary shaft of the brake.

Having thus described my invention in detail as it may be applied to a fluid brake in a well-drilling drawworks, it is seen that the invention provides a flexible coupling arrangement that is simple in construction, efficient in operation and can be easily assembled and disassembled. Furthermore, it is seen that the invention provides an arrangement for coupling power shafts of two mechanisms, which in operation may become misaligned, in such a way as will permit the use of a longer floating shaft between the mechanisms without increasing the distance between the mechanisms. Although the invention has been described with reference to an arrangement in which the floating shaft passes through a bore in the power shaft of a driven mechanism, it is obvious that a driving mechanism may be similarly connected to a floating shaft. Also, each of the driving mechanism and the driven mechanism may be provided with a bore through its power shaft and the floating shaft may extend through each of such bores, in which case the floating shaft would be longer than the combined length of the two coupled power shafts.

I claim:

1. In a brake mechanism for a rotary drawworks having a power operated shaft: a brake housing supported adjacent one end of said shaft, said housing having bearings defining an axis aligned with said shaft; a rotor in said housing; a tubular shaft supporting said rotor, said tubular shaft being supported by said bearings; a flexible drive coupling connected to the end of said tubular shaft far from said power operated shaft; a floating shaft extending through said hollow shaft, the end of said floating shaft far from said power operated shaft being connected to said flexible drive coupling; a self-aligning bearing on said power operated shaft supporting the near end of said floating shaft; and a flexible drive coupling connecting said near end of said floating shaft to said power driven shaft.

2. In a drive connection between a power shaft and a mechanism having a rotor and a rigid support for said rotor having bearing means axially aligned with said power shaft: a tubular shaft supporting said rotor, one end of said shaft being contiguous to an end of said power shaft; self-aligning bearing means mounted on said end of said power shaft; a floating shaft extending through said tubular shaft and having one end thereof supported by said self-aligning bearing means; a flexible coupling connecting the opposite end of said floating shaft to the corresponding end of said hollow shaft; and a detachable flexible coupling connecting said one end of said floating shaft to said power shaft.

3. In means for transmitting power from a rotating driving member, carried by rigidly supported bearings, to a rotor disposed at an end of and approximately axially aligned with said driving member which is likewise carried by bearings which are rigidly supported; a hollow shaft supporting said rotor for rotation; rigid supporting means for said hollow shaft having bearings supporting said shaft for rotation, one end of said shaft being contiguous to said end of said driving member; a driving shaft for transmitting power from said driving member to said hollow shaft, said driving shaft extending through said hollow shaft from end to end thereof and being of external diameter smaller than the internal diameter of said hollow shaft so that the end of said driving shaft adjacent said end of said driving member may have limited radial movement relatively to the corresponding end of said hollow shaft; a flexible coupling means connecting one end of the shaft to said driving member; and flexible coupling means connecting the opposite end of said shaft to said hollow shaft.

References Cited in the file of this patent

UNITED STATES PATENTS

| 2,331,160 | Baker et al. | Oct. 5, 1943 |
| 2,498,572 | O'Leary | Feb. 21, 1950 |
| 2,518,481 | Maguire | Aug. 15, 1950 |
| 2,642,970 | Szekely | June 23, 1953 |
| 2,712,740 | Boyd | July 12, 1955 |

FOREIGN PATENTS

| 622,266 | Germany | Mar. 25, 1933 |